US007293902B2

(12) United States Patent
Komatsu

(10) Patent No.: US 7,293,902 B2
(45) Date of Patent: Nov. 13, 2007

(54) VEHICLE HEADLAMP

(75) Inventor: Motohiro Komatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 44 days.

(21) Appl. No.: 11/375,253

(22) Filed: Mar. 15, 2006

(65) Prior Publication Data

US 2006/0209557 A1 Sep. 21, 2006

(30) Foreign Application Priority Data

Mar. 15, 2005 (JP) .......................... P.2005-072504

(51) Int. Cl.
*B60Q 1/00* (2006.01)

(52) U.S. Cl. ...................... 362/539; 362/303; 362/305; 313/117

(58) Field of Classification Search ................ 362/538, 362/539, 303, 305; 313/117
See application file for complete search history.

(56) References Cited

U.S. PATENT DOCUMENTS 6,494,603 B1 * 12/2002 Takada ...................... 362/539

FOREIGN PATENT DOCUMENTS

JP 2001-76510 A 3/2001

* cited by examiner

*Primary Examiner*—Stephen F. Husar
(74) *Attorney, Agent, or Firm*—Sughrue Mion Pllc.

(57) ABSTRACT

A vehicle headlamp is provided with: a projection lens; a light source; a reflector for reflecting light, which has been directly emitted by the light source, to a front side along an optical axis; and a shade arranged between the projection lens and the reflector, for shading a part of light reflected by the reflector 24. A bright and dark boundary forming portion capable of forming a cutoff line of a light distribution pattern is formed at an upper edge portion of the shade. In a neighborhood of the bright and dark boundary forming portion on a front face of the shade, a low reflecting region is provided. A reflectance of the low reflecting region is lower than a reflectance of a high reflecting region. A reflectance of the high reflecting region is higher than a reflectance of a rear face of the shade.

5 Claims, 10 Drawing Sheets

VEHICLE HEADLAMP

The present application claims foreign priority based on Japanese Patent Application No. P.2005-072504, filed on Mar. 15, 2005, the contents of which are incorporated herein by reference.

BACKGROUND OF THE INVENTION

1. Field of the Invention

The present invention relates to a vehicle headlamp. More particularly, the present invention relates to a projector type vehicle headlamp.

2. Related Art

A projector type vehicle headlamp is provided with a reflector for reflecting light emitted by a light source; a projection lens for guiding the reflected light sent from the reflector; and a shade arranged between the reflector and the projection lens. A part of the reflected light sent from the reflector is shaded by the shade, and a light distribution pattern of a lower beam (passing beam) is made, in which a beam of upward irradiation light is removed.

In this type vehicle headlamp, a technique is provided by which a light chamber is made to look bright, for example, when a front face of the shade is subjected to surface treatment so that the front face can be made to be brighter than the back face and the vehicle headlamp can look well when it is not turned ON. Concerning this technique, for example, refer to JP-A-2001-076510.

In the above technique, in order to enhance the appearance of a vehicle headlamp, the front face of the shade is made to be bright. However, when the front face of the shade is made to be bright, there is a possibility that so-called glare is caused at the time of turning on the headlamp by the irregular reflection and the reflection of external light.

Therefore, it is necessary to suppress an influence given to a car running in the opposite lane or a pedestrian by glare generated when the vehicle headlamp is turned on.

SUMMARY OF THE INVENTION

One or more embodiments of the present invention provide a highly safe vehicle headlamp in which an influence of glare given to a car running in an opposite lane or a pedestrian generated at the time of lighting is suppressed.

In accordance with one or more embodiments of the present invention, a vehicle headlamp is provided with: a projection lens arranged on an optical axis extending in a longitudinal direction of a vehicle; a light source arranged at a rear of a rear side focus of the projection lens; a reflector that reflects light directly emitted by the light source to a front side along the optical axis; a shade arranged between the projection lens and the reflector, wherein the shade shades a part of light reflected by the reflector; a bright and dark boundary forming portion formed at an upper edge portion of the shade, wherein the bright and dark boundary forming portion forms a cutoff line of a light distribution pattern; a high reflecting region arranged on a front face of the shade, wherein a reflectance of the high reflecting region is higher than a reflectance of a rear face of the shade; and a low reflecting region arranged on the front face of the shade, wherein a reflectance of the low reflecting region is lower than the reflectance of the high reflecting region.

According to the vehicle headlamp composed as described above, the high reflecting region, the reflectance of which. is higher than the reflectance of the back face of the shade, is provided on the front face of the shade.

Therefore, especially when the vehicle headlamp is not turned on, the light chamber can be made to look bright, that is, the light chamber can be made to look well. Further, since the low reflecting region, the reflectance of which is lower than the reflectance of the high reflecting region, is provided, the generation of glare in this low reflecting region can be positively prevented. In other words, it is possible to form a glare preventing region in which the generation of glare can be positively suppressed. Accordingly, an influence of glare can be suppressed when a vehicle is running.

In this connection, the reflectance of the low reflecting region may be higher or lower than the reflectance of the back face of the shade. For example, the reflectance of the low reflecting region may be equal to the reflectance of the back face of the shade.

Further, in accordance with one or more embodiments of the present invention, the low reflecting region may be provided in a neighborhood of a lower portion of the bright and dark boundary forming portion.

According to this constitution, the shading side in the neighborhood of the cutoff line of the light distribution pattern formed by the shade can be made to be a glare preventing region in which the generation of glare can be positively prevented.

Further, in accordance with one or more embodiments of the present invention, the low reflecting region may be provided in a neighborhood of a central portion of the bright and dark boundary forming portion where a cutoff line of the light distribution pattern on the opposite lane side is formed.

According to this constitution, the shading side in the neighborhood of the central portion of the cutoff line of the light distribution pattern formed by the shade can be made to be a glare preventing region in which the generation of glare can be positively prevented. Therefore, it is possible to suppress an influence of glare especially given to a car running in the opposite lane when the vehicle is running.

Further, in accordance with one or more embodiments of the present invention, the low reflecting region maybe provided in the neighborhoods of a right and a left edge portion of the bright and dark boundary forming portion.

According to this constitution, the shading side in the neighborhood of the right and left edge portion of the cutoff line of the light distribution pattern formed by the shade can be made to be a glare preventing region in which the generation of glare can be positively prevented. Therefore, it is possible to suppress an influence of glare especially given to a pedestrian when the vehicle is running.

Further, in accordance with one or more embodiments of the present invention, the low reflecting region may be provided along the entire bright and dark boundary forming portion.

According to this constitution, the shading side along the cutoff line of the light distribution pattern formed by the shade can be made to be a glare preventing region in which the generation of glare can be positively prevented. Therefore, it is possible to suppress an influence of glare given to a car running in the opposite side lane and a pedestrian when the vehicle is running.

According to the vehicle headlamp of one or more embodiments of the present invention, the light chamber can be made to look bright by the high reflecting region when the headlamp is not turned on. Further, it is possible to form a glare preventing region in which the generation of glare can be positively prevented. Due to the foregoing, the appearance of the vehicle headlamp can be enhanced when the headlamp is not turned on. Further, it is possible to suppress an influence given to a car, which is running in the opposite lane, or to a pedestrian by glare. Therefore, the safety can be greatly enhanced.

Other aspects and advantages of the invention will be apparent from the following description and the appended claims.

DESCRIPTION OF THE PREFERRED EMBODIMENTS

Embodiments of the invention will be described with reference to the accompanying drawings.

First Embodiment

First, a vehicle headlamp of the first embodiment is explained as follows.

Figure 1:
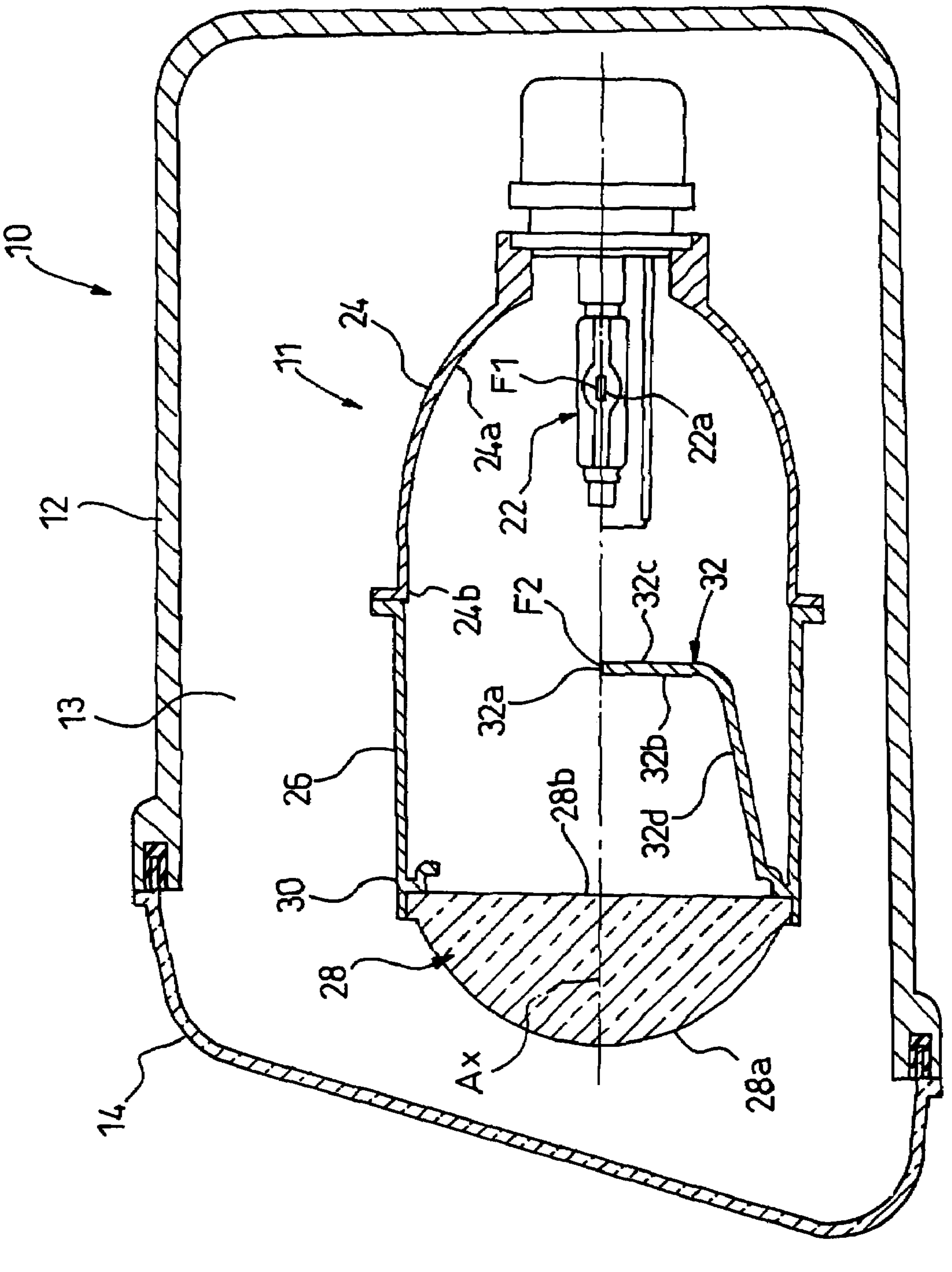
FIG. 1 is a sectional view for explaining an entire structure of a vehicle headlamp of a first embodiment.
Figure 2:
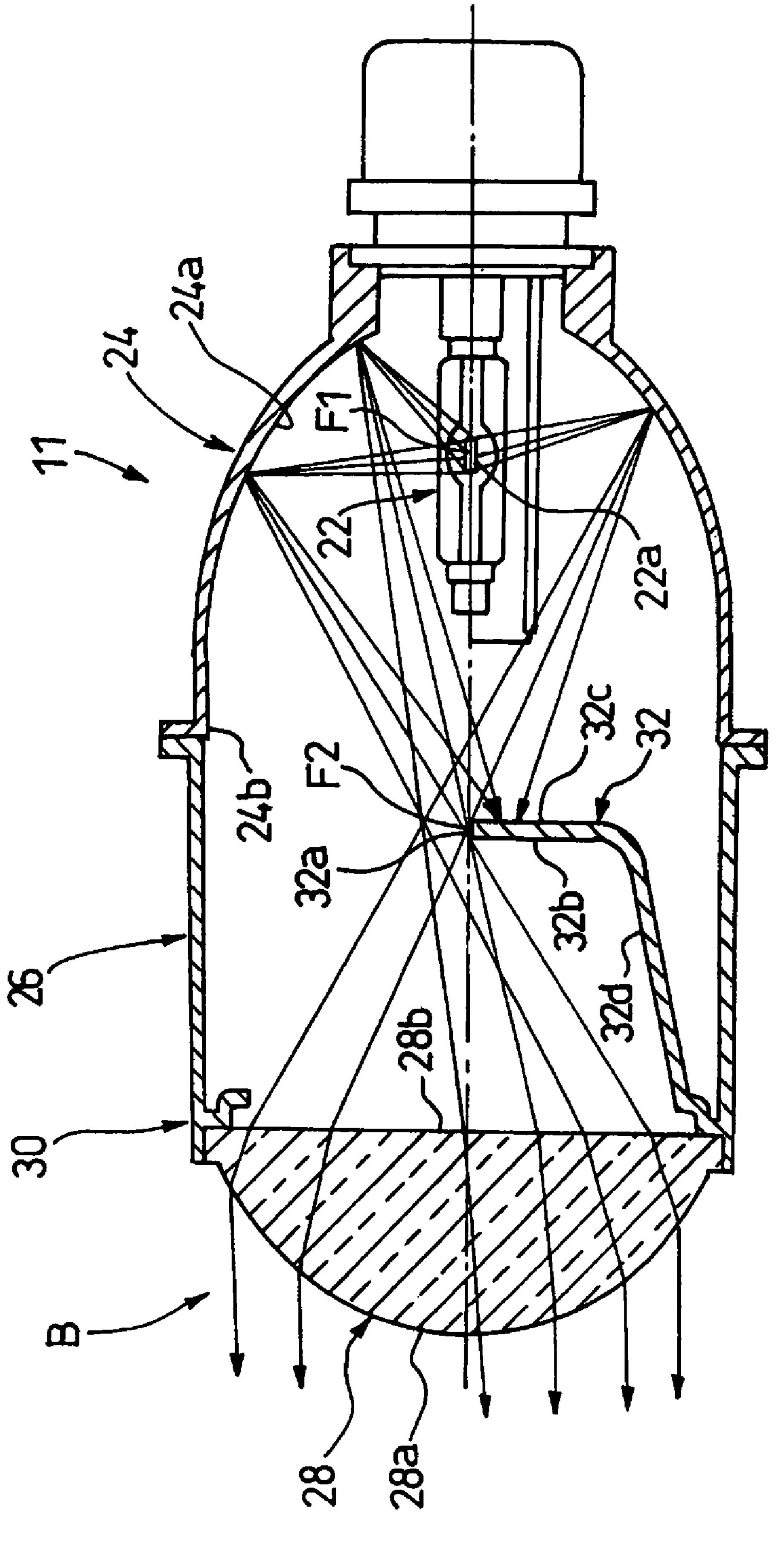
FIG. 2 is a sectional view for explaining a lighting device unit in a light chamber composing the vehicle headlamp.
Figure 3:
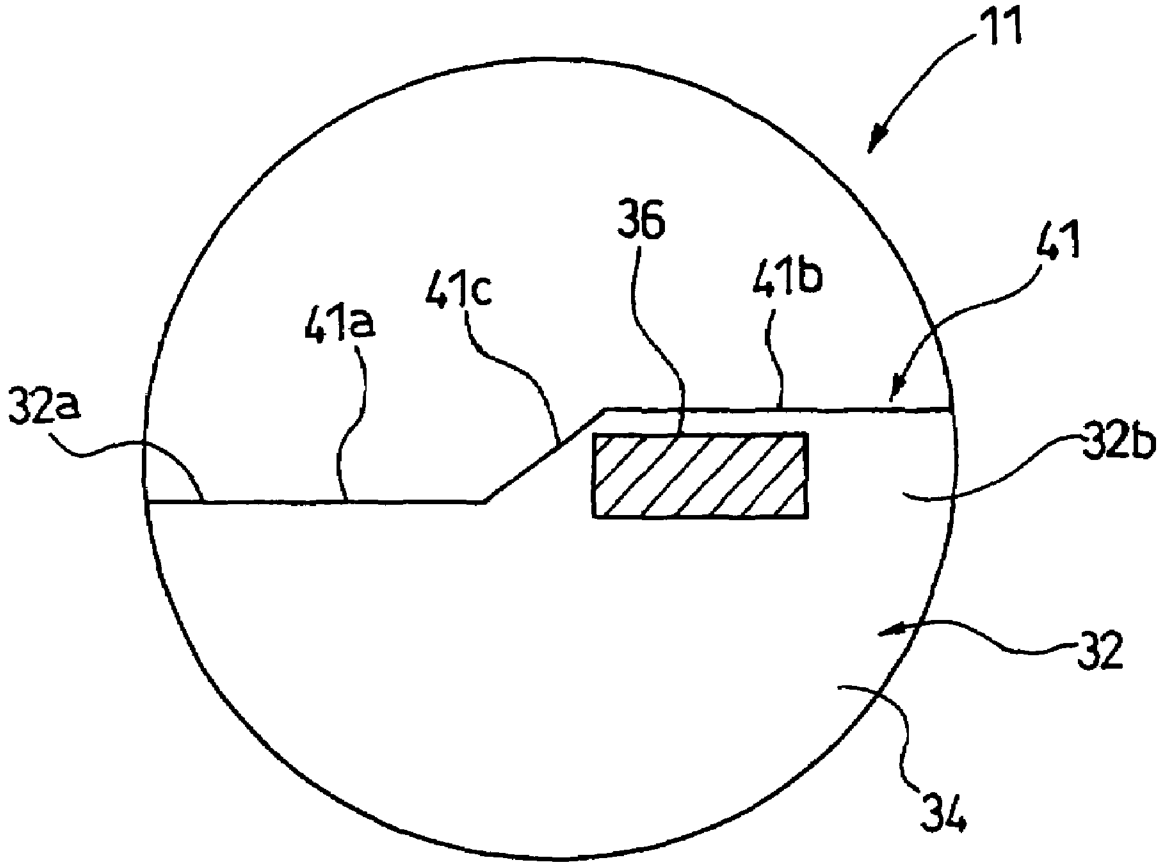
FIG. 3 is a front view showing a shade in the lighting device unit.
Figure 4:
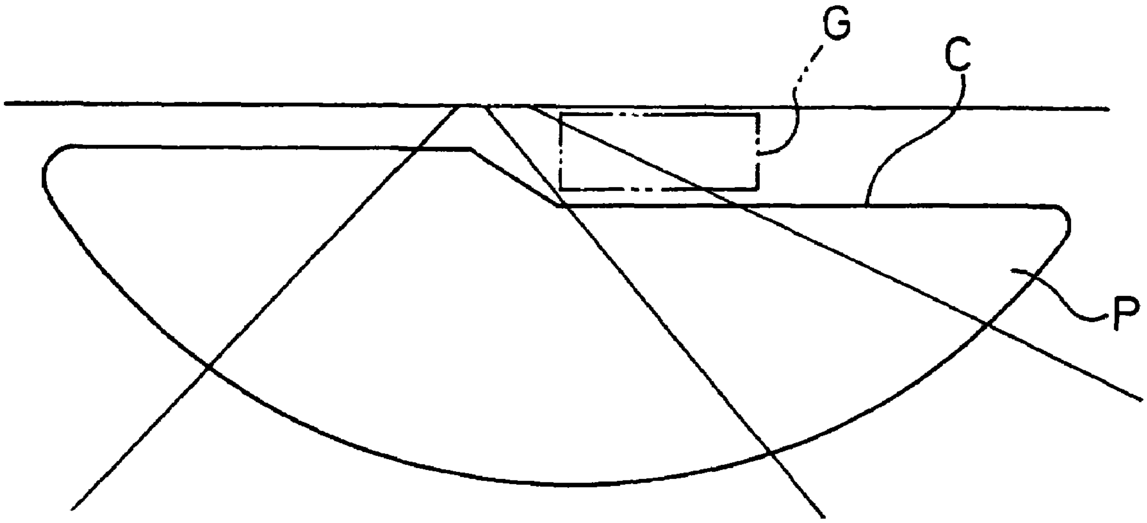
FIG. 4 is a view showing a light distribution pattern of irradiation light.

FIG. 1 is a sectional view for explaining an entire structure of the vehicle headlamp of the first embodiment, FIG. 2 is a sectional view for explaining a lighting device unit in a light chamber composing the vehicle headlamp, FIG. 3 is a front view showing a shade in the lighting device unit, and FIG. 4 is a view showing a light distribution pattern of irradiation light.

As shown in FIG. 1, the vehicle headlamp 10 is provided with a projector type lighting device unit 11. The lighting device unit 11 is housed in a light chamber 13 composed of a lamp body 12 and a transparent cover 14 attached to a front opening portion of the lamp body 12.

The lighting device unit 11 is supported by the lamp body 12 via an aiming mechanism (not shown). By this aiming mechanism, an attaching position and an attaching angle of the lighting device unit 11 with respect to the lamp body 12 can be finely adjusted.

As shown in FIG. 2, the lighting device unit 11 is provided with: a light source bulb 22, a reflector 24, a holder 26, a projection lens 28, a retaining ring 30 and a shade 32.

The light source bulb 22 is a discharge bulb such as a metal halide bulb in which the light source 22*a* is composed of a discharge light emitting portion. The light source bulb 22 is attached to the reflector 24 in such a manner that the light source 22*a* is located on the lighting device optical axis $A_x$ extending in the longitudinal direction of a vehicle.

The reflector 24 includes a substantially ellipsoidal reflecting face 24*a*, the central axis of which is the lighting device optical axis $A_x$. The sectional shape of this reflecting face 24*a* including the lighting device optical axis $A_x$ is substantially elliptical, and the eccentricity is set so that it can be gradually increased from the vertical cross section to the horizontal cross section. However, the rear side vertexes of the ellipses forming these cross sections are set at the same position.

The light source 22*a* is arranged at the first focus F1 of the ellipse composing the vertical cross section of this reflecting face 24*a*. Due to this structure, the reflecting face 24*a* reflects light sent from the light source 22*a* to the front side so that the light can come to the lighting device optical axis $A_x$. At this time, on the vertical cross section including the lighting device optical axis $A_x$, the light is substantially converged upon the second focus F2 of the above ellipse.

The holder 26 is made of aluminum by means of die casting. The holder 26 is formed into a cylindrical shape in such a manner that the holder 26 extends from the front end opening portion 24b of the reflector 24 to the front side. At the rear end portion, the holder 26 fixes and supports the reflector 24. At the front end portion, the holder 26 fixes and supports the projection lens 28 via the retaining ring 30.

The projection lens 28 is composed of a flat-convex lens, the front side surface 28*a* of which is convex and the rear side surface 28*b* of which is flat. The rear side focal position of the projection lens 28 coincides with the second focus F2 of the reflecting face 24*a* of the reflector 24. Due to the above structure, the projection lens 28 transmits the reflecting light, which is sent from the reflecting face 24*a* of the reflector 24, and condenses the reflecting light so that it can proceed along the lighting device optical axis $A_x$.

The shade 32 is formed being integrated with the holder 26 so that the shade 32 can be located in a lower portion of the inner space of the holder 26. The shade 32 shades a portion of the reflecting light sent from the reflecting face 24*a* so that an upward beam of irradiation light emergent from the vehicle headlamp 10 can be removed. Due to the foregoing, a lower beam of irradiation light B, which is irradiated downward with respect to the lighting device optical axis $A_x$, can be obtained.

The shade 32 is formed so that its upper end edge 32*a* can pass through the second focus F2. As shown in FIG. 3, this upper end edge 32*a* is a bright and dark boundary forming portion 41 which composes a cutoff line of the light distribution pattern. When this bright and dark boundary forming portion 41 is seen from the front face side of the shade 32, one's own lane side horizontal line 41*a*, which is formed horizontally, is provided on the left, and the opposite lane side horizontal line 41*b*, which is formed horizontally, is provided on the right.

The height of one's own lane side horizontal line 41*a* and the height of the opposite lane side horizontal line 41*b* are different from each other. One's own lane side horizontal line 41*a* is set to be low, and the opposite lane side horizontal line 41*b* is set to be high. An intermediate portion between one's own lane side horizontal line 41*a* and the opposite lane side horizontal line 41*b* is formed into an inclined line 41*c*, which is inclined by the approximate angle 15° so that the height can be gradually raised from the height of one's own lane side horizontal line 41*a* to the height of the opposite lane side horizontal line 41*b*.

The front face 32*b* of the shade 32, which is made of aluminum by means of die casting and integrated with the holder 26, is coated with blue paint. Since the front face 32*b* of the shade 32 is coated with bright paint, it is brighter than the rear face 32*c* of the shade 32 which is made of material of aluminum die casting and left as it is. Due to the foregoing, the front face 32*b* of the shade 32 is formed into a high reflecting region 34, the reflectance of which is higher than the reflectance of the rear face 32*c*. According to this high reflecting region 34, the reflectance of reflecting visual light is not less than 80%. The substantially semicircular cylindrical concave face 32*d* extending to the front side of this shade 32 is also coated with blue paint. Due to the foregoing, the color painted on this concave face 32*d* is brighter than the surface of the material of aluminum die casting, that is, the reflectance of this concave face 32*d* is high.

On the front face 32*b* of the shade 32, in the neighborhood of a lower portion of the bright and dark boundary forming portion 41 and the neighborhood of the opposite lane side horizontal line 41*b* in the central portion, the low reflecting region 36 is provided, the reflectance of which is lower than the reflectance of the surrounding high reflecting region 34 because the low reflecting region 36 is not coated with blue paint but the material of aluminum die casting is exposed from the low reflecting region 36. In this connection, according to this low reflecting region 36, the reflectance of visible light is not more than 40%.

In the above vehicle headlamp 10, the front face 32*b* of the shade 32 is the high reflecting region 34, the reflectance of which is higher than the reflectance of the rear face 32*c*. Therefore, when the front side of the headlamp 10 is observed from the upper side, the shade 32 can be relatively brightly seen through the projection lens 28. Further, for example, when the headlamp 10 is observed from an obliquely upper portion which is relatively close to the headlamp 10, a central region on the front face 32*b* of the shade 32 is seen being enlarged by the lens action of the projection lens 28. Therefore, the inside of the headlamp 10 can be considerably brightly seen.

That is, when the headlamp 10 is not turned on, the external light is transmitted through the projection lens 28 and incident upon the front face 32*b* of the shade 32 and the bright color of this front face 32*b* is reflected. Therefore, the inside of the lighting device unit 11 can be brightly seen. Due to the foregoing, the vehicle headlamp 10 can be made to look well.

When the lighting device is turned on, a portion of light, which has reflected on the reflecting face 24*a* of the reflector 24 and arrived at the projection lens 28, is reflected on the rear face 28*b* of the projection lens 28. This reflecting light collides with the front face 32*b* of the shade 32 which is the high reflecting region 34. Therefore, the bright color on the front face 32*b* is reflected. Accordingly, the inside of the lighting device unit 11 can be brightly seen.

When the above vehicle headlamp 10 is turned on at night, light directly emitted by the light source 22*a* of the light source bulb 22 is reflected to the front side by the reflector 24 and condensed by the projection lens 28 along the optical axis $A_x$ and irradiated to the front side of a vehicle as irradiation light B. At this time, a portion of the reflecting light sent from the reflector 24, which is supposed to be irradiated to the front side as irradiation light, is shaded by the shade 32.

Due to the foregoing, as shown in FIG. 4, the upward irradiation light, which is irradiated along the bright and dark boundary forming portion 41 of the shade 32, is removed from the front side of the vehicle. Therefore, as compared with one's own lane side, the opposite car lane side is widely shaded, that is, the opposite car lane side is irradiated by the lower beam light distribution pattern P having the cutoff line C.

In this case, the front face 32*b* of the shade 32 is the high reflecting region 34. Accordingly, when the headlamp is turned on, there is a possibility that so-called glare is generated by the irregular reflection and the reflection of the external light on the front face 32*b* of the shade 32.

However, according to the vehicle headlamp 10 of the above embodiment, the low reflecting region 36 is provided on the front face 32*b* of the shade 32 in the lower neighborhood of the bright and dark boundary forming portion and in the neighborhood of the horizontal line 41*b* on the opposite lane side close to the central portion. Therefore, the generation of glare in this low reflecting region 36 can be positively prevented. That is, as shown in FIG. 4, the neighborhood of the cutoff line C on the opposite lane side close to the center of the light distribution pattern P can be made to be the glare prevention region G in which the generation of glare can be positively prevented. Due to the foregoing, an influence given to a car running in the opposite lane by glare can be positively suppressed and the safety can be greatly enhanced.

In this connection, in the above embodiment, the low reflecting region 36 is not coated with paint of a bright color but the material of aluminum die casting is exposed from the low reflecting region 36 so that the low reflecting region 36 can be provided. However, the low reflecting region 36, the reflectance of which is lower than the reflectance of the high reflecting region 34, may be provided in such a manner that the shade 32 is subjected to surface treatment for reducing the reflectance or the shade 32 is coated with paint of dark color.

Except for coating the high reflecting region 34 with paint of a bright color, for example, the high reflecting region 34 can be formed by conducting vapor-deposition of aluminum upon the shade 32.

In this connection, the light source of the lighting device unit 11 of the above vehicle headlamp 10 is not limited to a metal halide bulb but a halogen bulb may be used.

Next, a vehicle headlamp of another embodiments will be explained as follows. In this connection, like reference characters are used to indicate like parts in the first embodiment and the embodiment described here and the duplicated explanations are omitted here.

Second Embodiment

Figure 5:
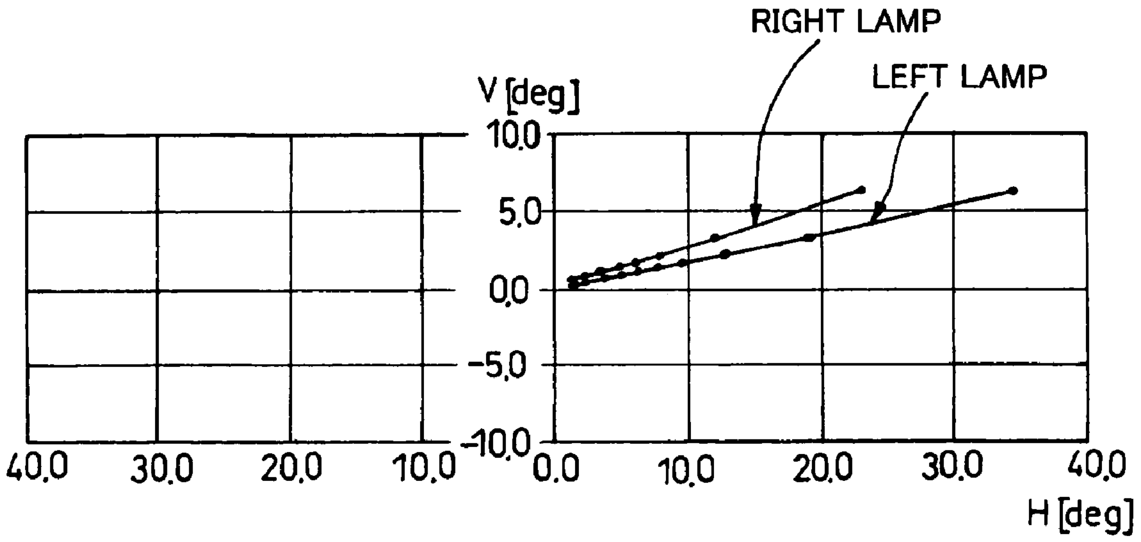
FIG. 5 is a graph showing a locus of the change in the angle of the eye of a driver in a car running in the opposite lane, wherein this change in the angle of the eye is seen from the headlamp side of one's own car.
Figure 6:
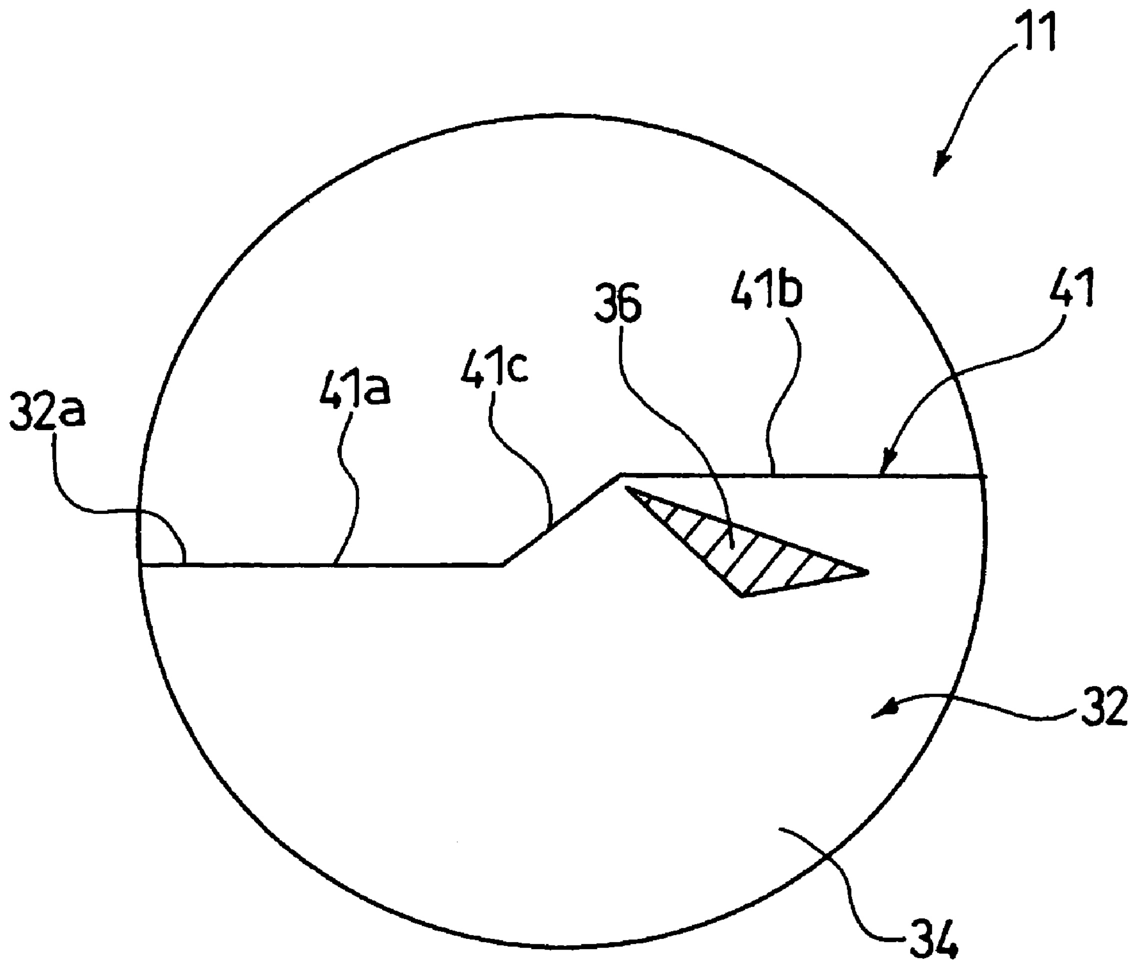
FIG. 6 is a front view showing a shade of the lighting device unit composing the headlamp of a second embodiment.

FIG. 5 is a graph showing a locus of the change in the angle of the eye of a driver in a car running in the opposite lane, wherein this change in the angle of the eye is seen from the headlamp side of one's own car. FIG. 6 is a front view showing a shade of the lighting device unit composing the headlamp of the second embodiment.

FIG. 5 shows a position of the eye of the driver in the car running in the opposite lane, wherein the eye of the driver is seen from the right headlamp of one's own car and also shows a position of the eye of the driver in the car running in the opposite lane, wherein the eye of the driver is seen from the left headlamp of one's own car. The axis of ordinate and the axis of abscissa respectively show an angle in the vertical direction and an angle in the horizontal direction, wherein the front center of one's own car is made to be the basis (coordinates (0, 0)). In this connection, FIG. 5 shows an example in which a distance between one's own car and the car running in the opposite lane becomes 5 m from 100 m.

As shown in FIG. 5, in the case where a distance between one's own car and a car running in the opposite lane is long when the car runs on a straight road, the eye of the driver who drives the car running in the opposite lane is located at a position (the neighborhood of the center of the graph), the angle with respect to the headlamp of one's own car of which is small. As a distance between one's own car and the car running in the opposite lane is shortened, the angle in the vertical direction is increased and the angle in the horizontal direction is also increased. Further, in the case where one'sown car is running in the left lane, the left headlamp is located at a position distant from the driver who drives the car running in the opposite lane in the horizontal direction. Therefore, a change in the angle in the horizontal direction of the left head light is larger than a change in the angle in the horizontal direction of the right head light.

As described above, when the cars are coming close to each other, the position of the eye of the driver of the car running in the opposite lane with respect to the right and the left headlamp of one's own car is moved obliquely upward to the right while gradually extending.

While consideration is being given to the fact that the position of the eye of the driver of the car running in the opposite lane moves obliquely upward with respect to the headlamp of one's own car, the glare preventing region G may be a region, in which the car running in the opposite lane is existing, which covers a locus of the movement of the car running in the opposite lane in the front view including this locus.

Therefore, in the second embodiment, in order to form the above glare preventing region G, as shown in FIG. 6, the low reflection region 36, which gradually extends obliquely downward to the right in the front view, is provided in the neighborhood of the horizontal line 41*b* on the opposite lane side in the neighborhood of the central portion of the bright and dark boundary forming portion 41 on the front face 32*b* of the shade 32.

According to this second embodiment, by the low reflection region 36 which is provided on the front face 32*b* of the shade 32, the region, in which the car running in the opposite lane exists, for covering the locus of the movement of the car running in the opposite lane is made to be the glare preventing region G. Therefore, an influence of glare given to the car running in the opposite lane can be positively suppressed.

In this connection, on the shade 32 shown in FIG. 6, the glare preventing region G is formed which can be applied to both the right and the left headlamp. However, separate shades, on which different glare preventing regions for the right and the left headlamp are individually provided, may be used. In this case, on the shade for the left headlamp, the region, in which the car running in the opposite lane exists corresponding to the right line (the left lamp) shown in FIG. 5, may be formed as the glare preventing region. On the shade for the right headlamp, the region, in which the car running in the opposite lane exists corresponding to the left line (the right lamp) shown in FIG. 5, may be formed as the glare preventing region.

Third Embodiment

Figure 7:
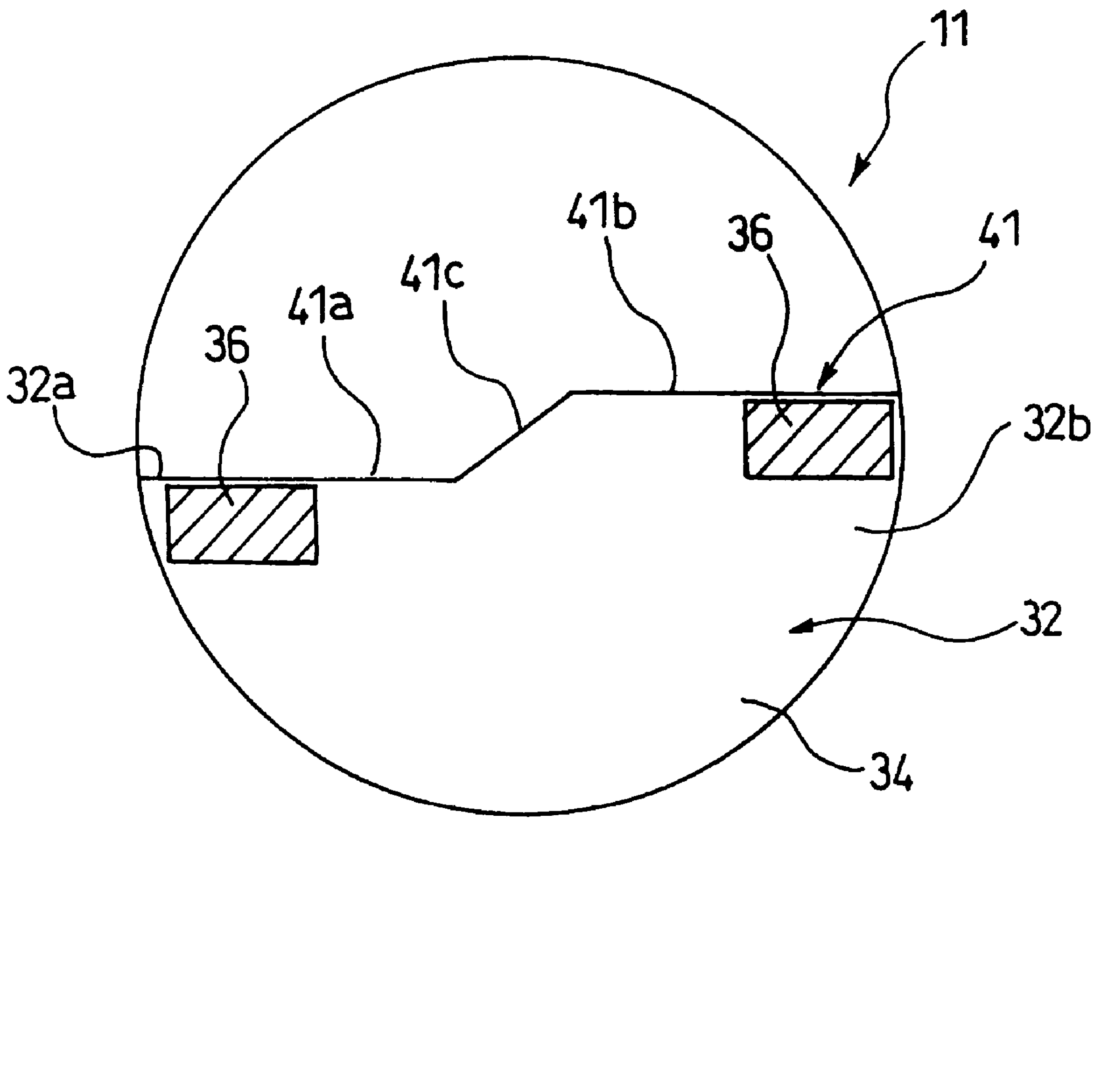
FIG. 7 is a front view showing a shade in the lighting device unit composing the vehicle headlamp of a third embodiment.
Figure 8:
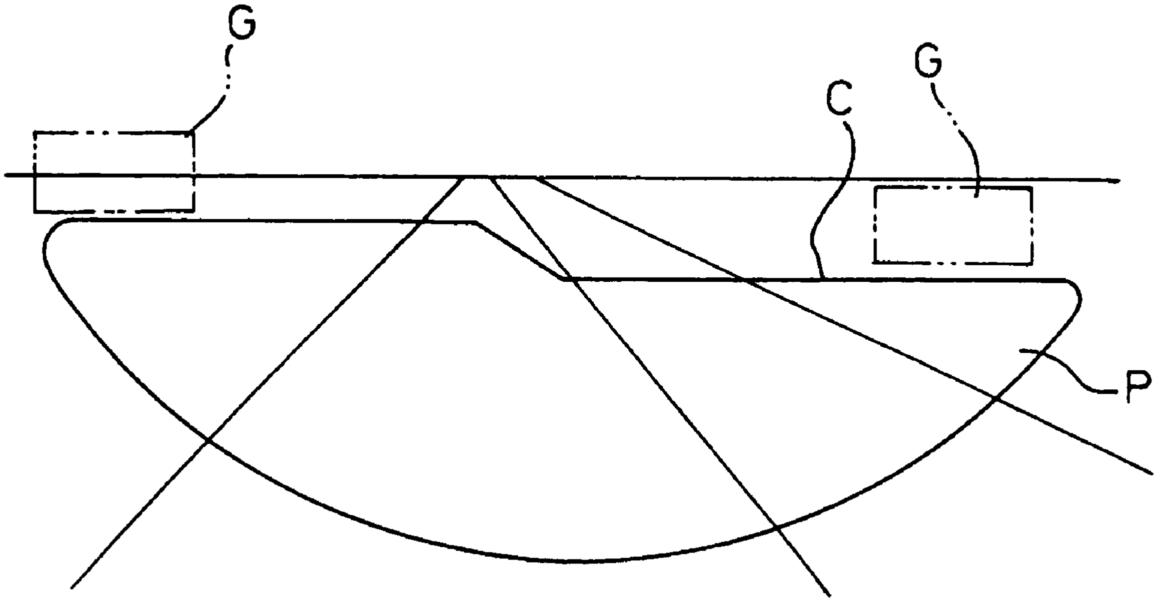
FIG. 8 is a view showing a light distribution pattern of irradiation light.

FIG. 7 is a front view showing a shade in the lighting device unit composing the vehicle headlamp of the third embodiment. FIG. 8 is a view showing a light distribution pattern of irradiation light.

As shown in FIG. 7, in this embodiment, the low reflecting regions 36 are respectively provided in the neighborhoods of the right and the left edge portion of the bright and dark boundary forming portion 41 on the front face 32*b* of the shade 32.

Accordingly, in the vehicle headlamp 10 of this embodiment, as shown in FIG. 4, the neighborhood portions of the cutoff line C in the right and left edge portion of the light distribution pattern P are the glare preventing regions G in which the generation of glare can be positively prevented.

That is, in this embodiment, the low reflecting regions 36 are respectively provided in the neighborhoods of the right and the left edge portion of the bright and dark boundary forming portion 41 on the front face 32*b* of the shade 32. Therefore, the generation of glare in these low reflecting regions 36 can be positively prevented. Accordingly, influences given to the pedestrians walking on the right and the left of the road can be positively prevented.

Fourth Embodiment

Figure 9:
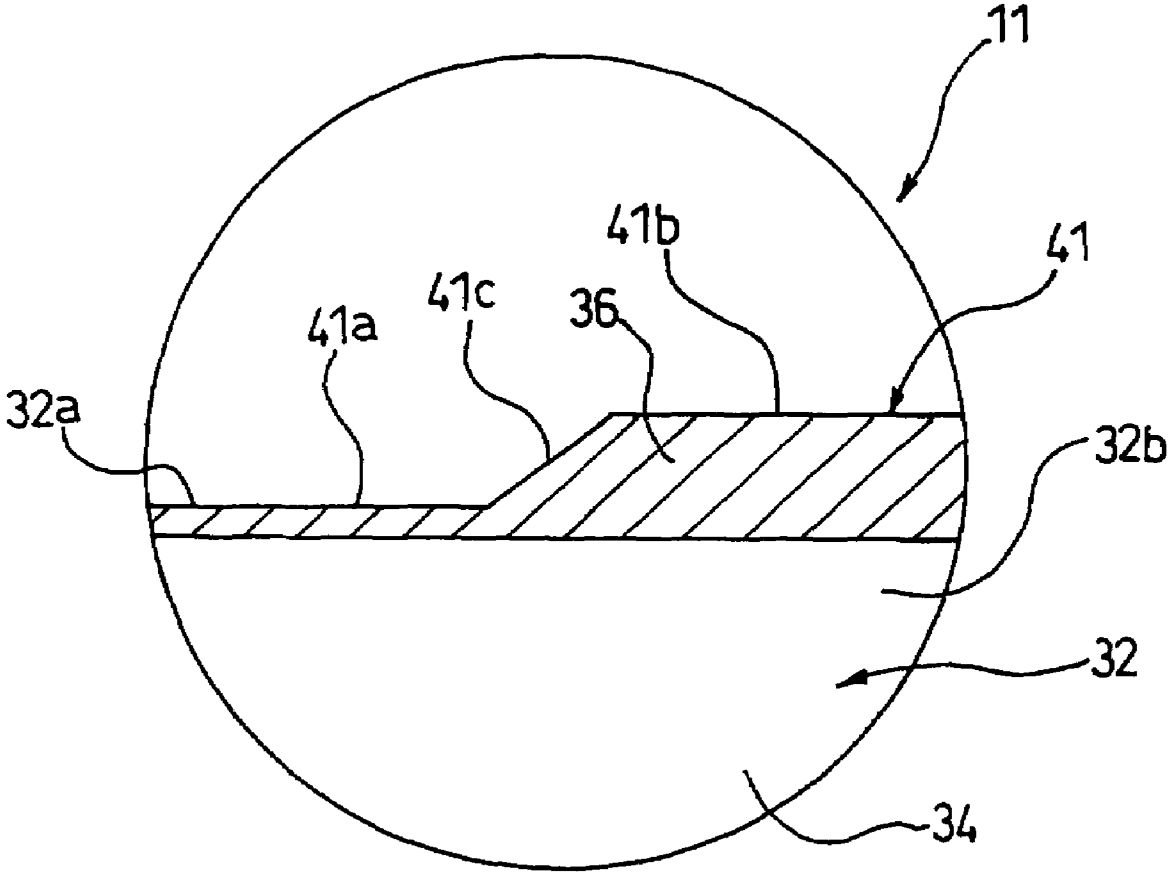
FIG. 9 is a front view of the shade in the lighting device unit composing the vehicle headlamp of a fourth embodiment.
Figure 10:
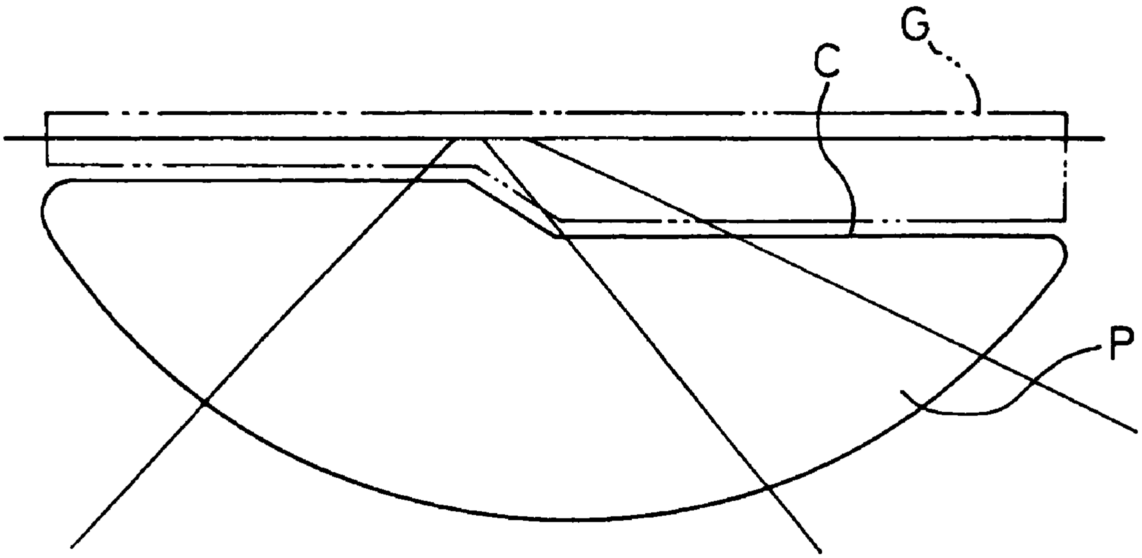
FIG. 10 is a view showing a light distribution pattern of irradiation light.

FIG. 9 is a front view of the shade in the lighting device unit composing the vehicle headlamp of the fourth embodiment. FIG. 10 is a view showing a light distribution pattern of irradiation light.

As shown in FIG. 9, in this embodiment, the low reflecting region 36 is provided along the entire bright and dark boundary forming portion 41 on the front face 32*b* of the shade 32.

Accordingly, as shown in FIG. 10, in the vehicle headlamp 10 of this embodiment, a portion located along the cutoff line C in the neighborhood of the cutoff line C of the light distribution pattern P is made to be a glare preventing region G in which the generation of glare can be positively prevented.

That is, according to the vehicle headlamp of this embodiment, the low reflecting region 36 is provided along the entire bright and dark boundary forming portion 41 on the front face 32*b* of the shade 32. Therefore, the generation of glare in these low reflecting regions 36 can be positively prevented. Accordingly, influences of glare given to the car running in the opposite lane and the pedestrians walking on the right and the left of the road can be positively prevented.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:

a projection lens arranged on an optical axis extending in a longitudinal direction of a vehicle;

a light source arranged at a rear of a rear side focus of the projection lens;

a reflector that reflects light directly emitted by the light source to a front side along the optical axis;

a shade arranged between the projection lens and the reflector, wherein the shade shades a part of light reflected by the reflector;

a bright and dark boundary forming portion formed at an upper edge portion of the shade, wherein the bright and dark boundary forming portion forms a cutoff line of a light distribution pattern;

a high reflecting region arranged on a front face of the shade, wherein a reflectance of the high reflecting region is higher than a reflectance of a rear face of the shade; and a low reflecting region arranged on the front face of the shade, wherein a reflectance of the low reflecting region is lower than the reflectance of the high reflecting region.

2. The vehicle headlamp according to claim 1, wherein the low reflecting region is provided in a neighborhood of a lower portion of the bright and dark boundary forming portion.

3. The vehicle headlamp according to claim 1, wherein the low reflecting region is provided in a neighborhood of a central portion of the bright and dark boundary forming portion where a cutoff line of the light distribution pattern on an opposite lane side is formed.

4. The vehicle headlamp according to claim 1, wherein the low reflecting region is provided in neighborhoods of a right and a left edge portion of the bright and dark boundary forming portion.

5. The vehicle headlamp according to claim 1, wherein the low reflecting region is provided along the entire bright and dark boundary forming portion.

* * * * *